Jan. 21, 1958 L. I. COONTZ, JR 2,820,312

ETCHING TEMPLATE

Filed Dec. 23, 1954 2 Sheets-Sheet 1

INVENTOR.
LELAND I. COONTZ, JR.
BY William R. Lane
ATTORNEY

INVENTOR.
LELAND I. COONTZ, JR.
BY William R. Lane
ATTORNEY

United States Patent Office 2,820,312

Patented Jan. 21, 1958

2,820,312

ETCHING TEMPLATE

Leland I. Coontz, Jr., Long Beach, Calif., assignor to North American Aviation, Inc.

Application December 23, 1954, Serial No. 477,260

3 Claims. (Cl. 41—9)

This invention pertains to a template to be used in an etching bath in combination with a workpiece where the template covers and seals off a portion or portions of the workpiece not to be etched. More particularly, this invention is directed to a template in which a vacuum is the means for sealing and holding the workpiece to or in the template. The template described herein is applicable to etching processes in general and is particularly applicable for use in the chemical milling process described in U. S. patent application, Serial No. 389,289, filed October 30, 1953, now U. S. Patent No. 2,739,047 for "Process of Chemically Milling Structural Shapes" in the name of Manuel C. Sanz.

In the chemical reduction of metal or glass, masking has been applied directly to the surface to be reduced or etched by some method involving adhesion. Means of masking the part to be etched, herein described as the workpiece, usually requires a lengthy manufacturing procedure comprising cleaning, painting, or plating or preparation for these operations. These operations can generally be entirely eliminated by the present invention, which is a template with a pattern made therein so that the portion of the workpiece desired to be etched is exposed to the chemical bath in which it is inserted and the remainder of the workpiece is enclosed by the template. The enclosed portion of the workpiece is held and sealed in or on the template by means of a vacuum applied between the template and the workpiece. One end of a suction line is attached to a metal part of the template and the other end may be attached to a vacuum pump. The seal between the template and the workpiece in juxtaposition to the exposed portion is perfected by means of a gasket cut to conform to the pattern of the template. Use of vacuum for holding and sealing a template to workpiece makes possible a rapid means of masking flat or simply contoured parts.

Therefore, a principal object of this invention is to provide a rapid means of masking flat or simply contoured parts prior to etching the unmasked portion of said parts.

An object of this invention is to provide an etching template that eliminates the steps of cleaning, painting, or plating of the workpiece in preparation for etching.

Another principal object of this invention is to provide an etching template that is held and sealed to the workpiece by means of a vacuum and without the use of bolts, clamps or similar holding means.

A further object of this invention is to provide an etching template that can be secured to a workpiece with a minimum of skill.

A still further object of this invention is to provide a means for masking which eliminates long drying time periods as required for paint masking.

Further objects of invention will become apparent from the following description taken in connection with the accompanying drawings, in which Fig. 1 is a general schematic view showing one form of the invention in operation;

Figure 6:
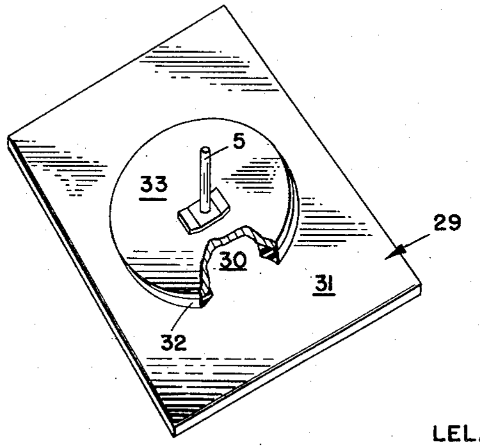

And Fig. 6 is a partially cutaway perspective view of a template and a workpiece where a central portion of the workpiece is masked.

Figure 1:
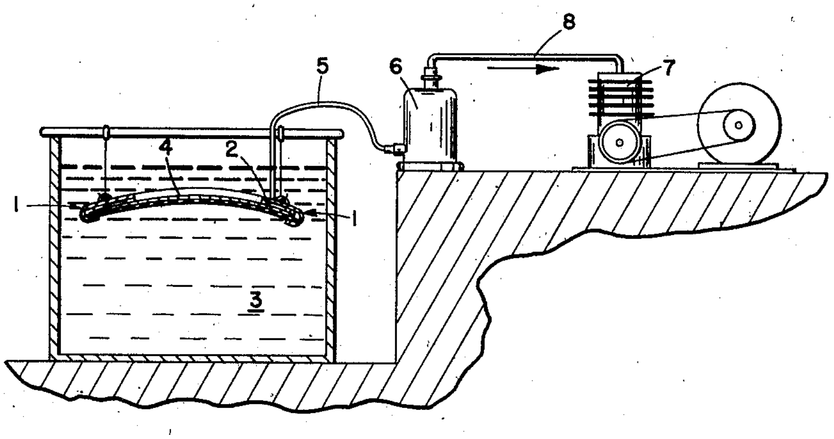

In Fig. 1, the cross-section of the template 1 and workpiece 2 are shown suspended in an etching bath 3 in which the particular chemical etchant used depends upon the metal being etched and on the desired etching rate. In the etching of aluminum, for example, caustic soda is normally used. The workpiece 2 comprises a curved metal sheet and is masked by the template 1 on both sides and the edges except for the uncovered, centrally-located upper portion 4. The exposed portion 4 is chemically attacked by the etchant, resulting in a chemically-milled sheet, shown in Fig. 4, having a central area of less thickness than the original material and the remaining non-etched portions. Vacuum line 5 is connected at one end to template 1 and at the other end to trap 6. Trap 6 is, in turn, connected to vacuum pump 7 by tubing 8. While the template and workpiece are immersed, the pump operates continuously, maintaining a vacuum in the system. By means of this vacuum, template 1 is held and sealed to workpiece 2. The trap 6 is put into the system to protect the pump if a leak should develop. If it should be desired to etch on more than one workpiece or use more than one template at the same time, a manifold would be necessary with a trap and valve for each outlet. Such metals as titanium, aluminum and steel have been successfully etched and monitored using the present invention as a template in appropriate alkaline or acid etched solutions.

Figures 2, 3:
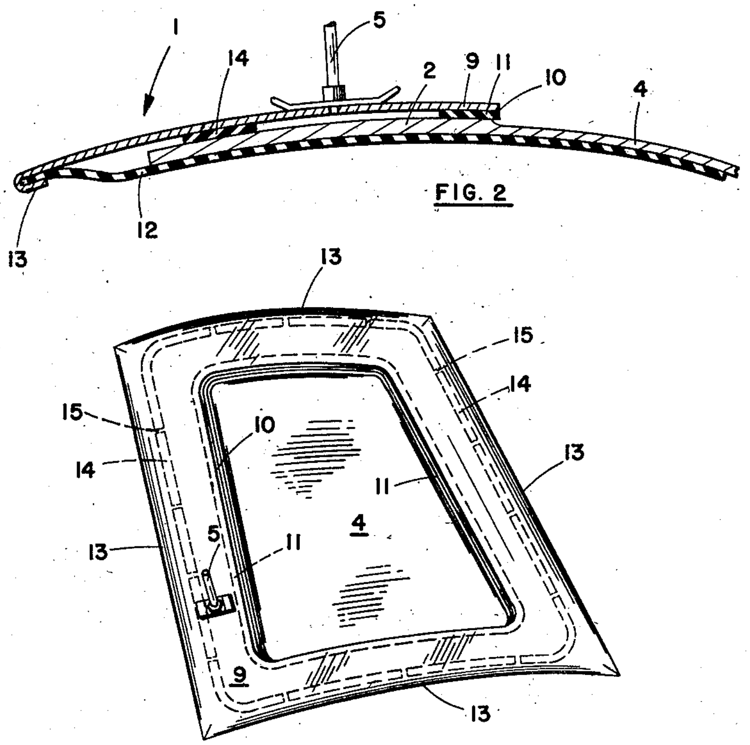
Fig. 2 shows a detailed cross-section of a portion of the workpiece and template of Fig. 1.
Fig. 3 is a perspective view of the template and workpiece of Fig. 1.

In Figs. 2 and 3, the structure for the sealing and holding of the workpiece in the template of Fig. 1 by means of a vacuum is shown in detail. The metal top 9 of template 1 has a pattern 10 cut in the central portion so as to expose workpiece 2 to the extent of portion 4 which is the area desired to be etched. Gasket 11, of rubber or similar material, is bonded to top 9 to conform to the inner edges of pattern 10 and the outer boundaries of portion 4. On the underside of workpiece 2, forming the lower sealing surface of template 1, is a sheet of pliable material 12, such as rubber. This material is loosely held on all sides of template 1 by folded edges 13 of metal top 9. When the vacuum is applied through line 5, pliable material 12 is sealed in edges 13, and metal top 9 is forced toward the upper side of workpiece 2, causing a seal along the edges of gasket 11. Thus, only portion 4 of workpiece 2 is exposed to the bath. In order to prevent the metal top 9 along the edges of pattern 10 from lifting away from workpiece 2, spacer strip 14 is placed as shown between the workpiece and template top 9, and is generally parallel and coextensive with gasket 11, except that it has breaks at intervals to make vacuum passages 15 shown in Fig. 3. Strip 14 is of approximately the same thickness as gasket 11 and may be of the same material. For convenience it also should be bonded to the under side of top 9. The application of vacuum to the above-described structure makes a very effective seal and holds the parts together with such great strength that it is extremely difficult to force them apart.

Figure 4:
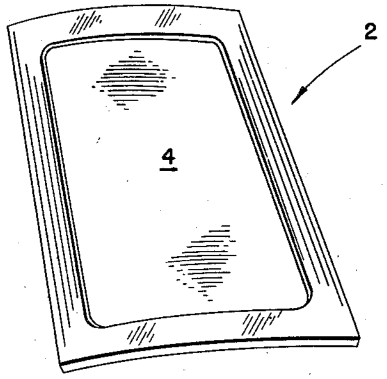
Fig. 4 shows the workpiece of Fig. 1 after completion of the operation.

In Fig. 4 the completed etching on workpiece 2 is shown. Metal that was in the area of portion 4 has been chemically-milled away, forming smooth edges along the metal where gasket 11 had been.

Figure 5:
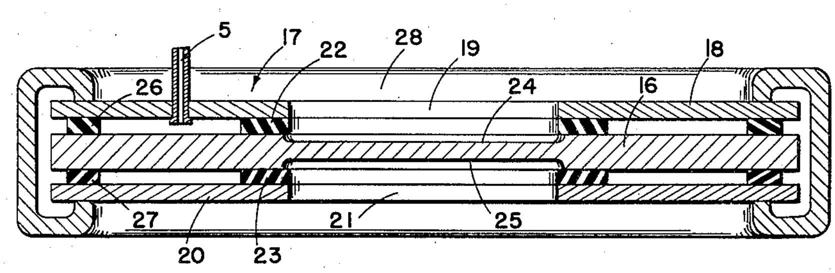
Fig. 5 is a cross-sectional view of a template and a workpiece where portions of both sides of the workpiece are being etched.

Referring to Fig. 5, where workpiece 16 is exposed on both sides for etching, template 17 has a metal top 18 with pattern 19 cut therein and a metal bottom 20 with pattern 21 cut therein. In the manner indicated above, gasket 22 is placed between template top 18 and workpiece 16, and gasket 23 is placed between template bottom 20 and workpiece 16 to form a seal between the exposed portions 24 and 25, respectively, of the workpiece and the unexposed portions covered by the template. Spacer strips 26 and 27 are inserted between the workpiece and the template top and bottom as indicated in the description of Fig. 2 above. A cover 28 of pliable material, such as rubber, is fitted around the edges of top 18 and bottom 20 and extends over their external faces. When the vacuum is applied through line 5, cover 28 becomes a tight seal around the edges of the template, and the template and workpiece become a rigid structure.

In Fig. 6, a workpiece 29 is masked on a central or interior portion 30, and the exposed portion 31 extends over both sides of workpiece 29. However, as can be readily seen, the template of Fig. 5 could be used in conjunction with the template of Fig. 6. Here, a gasket 32 is bonded under the edges 34 of template 33, and when the vacuum is applied through line 5, workpiece 29 is tightly held and sealed against masked portion 30. No spacer strip, as described above, is needed in this type of template.

The templates described are easily constructed and provide masking structures than can be rapidly applied and that have a positive seal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An etching template for masking a predetermined area of at least one side of a workpiece to be immersed in an etching bath comprising a first masking means having an outer peripheral edge and an inner peripheral edge formed in a predetermined pattern, a gasket continuously sealed to one surface of said member at said inner edge thereof, said gasket being of relatively limited width having an inner edge corresponding to said pattern and an outer edge spaced from the outer edge of said masking means, second masking means including at least a resilient outer edge portion substantially coextensive with the outer edge of said first masking means and sealingly engaged therewith, a discontinuous spacing strip secured to said one surface and spaced from said gasket, said strip being substantially coextensive with said gasket, said second masking means having a body portion spaced from said one surface, said strip and said gasket for receiving a workpiece therebetween, and means in fluid communication with the space between said first and second masking means for evacuating said space.

2. An etching template for masking a predetermined area of at least one side of a workpiece to be immersed in an etching bath comprising a masking member having an outer peripheral edge and an inner peripheral edge formed in a predetermined pattern, a gasket continuously sealed to one surface of said member at said inner edge thereof, said gasket being of relatively limited width having an inner edge corresponding to said pattern and an outer edge spaced from the outer edge of said masking member, a continuous masking sheet having at least a resilient outer edge substantially coextensive with the outer edge of said masking member and sealingly engaged therewith, a discontinuous spacing strip secured to said one surface and spaced from said gasket and said outer edge of said masking member, said strip being substantially coextensive with said gasket, said sheet having a body portion spaced from said one surface, said strip and said gasket for receiving a workpiece therebetween, and means in fluid communication with the space between said one surface and sheet for evacuating said space.

3. An etching template for masking predetermined areas of two sides of a workpiece to be immersed in an etching bath comprising a first masking member having an outer peripheral edge and an inner peripheral edge formed in a first pattern, a second masking member having one surface thereof facing and spaced from one surface of said first member, said second masking member having an outer peripheral edge substantially coextensive with said first mentioned outer edge and an inner peripheral edge formed in a second pattern, first and second gaskets continuously sealed to said first and second member surfaces at respective inner edges thereof, said gaskets being of relatively limited width and each having an inner edge corresponding to a respective one of said patterns, each gasket having an outer edge spaced from said coextensive outer edges, a resilient cover of substantially C-shaped cross-section substantially coextensive with said member outer edges sealingly engaged with both said members adjacent said outer edges thereof, first and second discontinuous spacing strips secured to respective ones of said surfaces and each spaced from said gaskets, and means in fluid communication with the space between said facing surfaces for evacuating said space.

References Cited in the file of this patent

UNITED STATES PATENTS

| | | |
|---|---|---|
| 393,867 | Tompsett | Dec. 4, 1888 |
| 825,961 | Deckert | July 17, 1906 |
| 1,725,454 | Heyl | Aug. 20, 1929 |
| 1,851,028 | Worrall | Mar. 29, 1932 |
| 2,341,702 | Duggan | Feb. 15, 1944 |
| 2,371,859 | Wallace | Mar. 20, 1945 |

FOREIGN PATENTS

| | | |
|---|---|---|
| 167,298 | Great Britain | Aug. 8, 1921 |